United States Patent
Butler et al.

(10) Patent No.: US 11,074,354 B2
(45) Date of Patent: Jul. 27, 2021

(54) SEGMENTING, REDACTING, AND TRANSPORTING SECURE DOCUMENTS IN A MIXED SECURITY ENVIRONMENT

(71) Applicant: International Business Machines Corporation, Armonk, NY (US)

(72) Inventors: Christopher John Butler, Victoria (AU); Timothy M. Lynar, Melbourne (AU); Adam Joseph Makarucha, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 16/135,532

(22) Filed: Sep. 19, 2018

(65) Prior Publication Data

US 2020/0089900 A1    Mar. 19, 2020

(51) Int. Cl.
| | |
|---|---|
| *G06F 21/62* | (2013.01) |
| *G06F 21/60* | (2013.01) |
| *H04L 29/06* | (2006.01) |
| *G06F 16/93* | (2019.01) |
| *G06F 16/28* | (2019.01) |
| *H04L 29/08* | (2006.01) |

(52) U.S. Cl.
CPC ........ *G06F 21/6209* (2013.01); *G06F 16/285* (2019.01); *G06F 16/93* (2019.01); *G06F 21/604* (2013.01); *H04L 63/105* (2013.01); *H04L 63/20* (2013.01); *H04L 67/06* (2013.01)

(58) Field of Classification Search
CPC .... G06F 21/6209; G06F 16/285; G06F 16/93; G06F 21/604; H04L 63/105; H04L 63/20; H04L 67/06
See application file for complete search history.

(56) References Cited

U.S. PATENT DOCUMENTS

| | | |
|---|---|---|
| 7,802,305 B1 | 9/2010 | Leeds |
| 7,873,838 B2 | 1/2011 | Staddon et al. |
| 8,407,805 B2 | 3/2013 | Warrington et al. |
| 8,417,666 B2 | 4/2013 | Bailor et al. |
| 8,838,554 B2 | 9/2014 | Treadwell et al. |

(Continued)

OTHER PUBLICATIONS

NPL Search (Google Scholar) (Year: 2020).*

(Continued)

*Primary Examiner* — Mahfuzur Rahman
*Assistant Examiner* — Richard W Cruz-Franqui
(74) *Attorney, Agent, or Firm* — Garg Law Firm, PLLC; Rakesh Garg; Joseph Petrokaitis

(57) ABSTRACT

Segmentation and classification of documents in a mixed security environment includes receiving a document including a plurality of subcomponents. A security classification level of each of the plurality of subcomponents is determined using a first classification model. The security classification level of each subcomponent includes one of a first classification level and a second classification level. A first subcomponent having the first classification level is routed to a first environment having a first security level. A second subcomponent having the second classification level is routed to a second environment having a second security level. A pointer for the second subcomponent is determined in which the pointer references a portion of the first subcomponent.

18 Claims, 5 Drawing Sheets

(56) References Cited

U.S. PATENT DOCUMENTS

| | | | |
|---|---|---|---|
| 9,075,796 B2* | 7/2015 | Markatou | G16H 50/70 |
| 10,467,252 B1* | 11/2019 | Barsony | G06F 16/35 |
| 2006/0259948 A1* | 11/2006 | Calow | G06F 21/6218 |
| | | | 726/1 |
| 2007/0094594 A1 | 4/2007 | Matichuk et al. | |
| 2008/0104118 A1* | 5/2008 | Pulfer | G06F 16/986 |
| 2010/0186091 A1* | 7/2010 | Turner | G06F 21/604 |
| | | | 726/26 |
| 2010/0218259 A1* | 8/2010 | Mishina | G06F 21/64 |
| | | | 726/26 |
| 2010/0313239 A1 | 12/2010 | Chakra et al. | |
| 2012/0215890 A1* | 8/2012 | Doyle | H04L 67/10 |
| | | | 709/219 |
| 2013/0029307 A1* | 1/2013 | Ni | G06N 20/00 |
| | | | 434/322 |
| 2016/0308902 A1* | 10/2016 | Beamon | H04L 63/08 |
| 2016/0364608 A1* | 12/2016 | Sengupta | G06F 16/345 |
| 2017/0161503 A1* | 6/2017 | Seigel | G06F 21/552 |
| 2017/0357807 A1* | 12/2017 | Harms | G06F 21/568 |
| 2018/0262481 A1* | 9/2018 | Doi | H04L 9/0866 |
| 2018/0329935 A1* | 11/2018 | Mugali | G06F 16/282 |
| 2018/0365248 A1* | 12/2018 | Zheng | G06F 40/40 |
| 2019/0147103 A1* | 5/2019 | Bhowan | G06F 16/353 |
| | | | 707/737 |
| 2019/0318109 A1* | 10/2019 | Thomas | H04L 63/0861 |
| 2019/0370540 A1* | 12/2019 | Freed | G06F 40/20 |
| 2019/0392250 A1* | 12/2019 | Aggarwal | G06F 40/30 |
| 2020/0089900 A1* | 3/2020 | Butler | G06F 21/6245 |

OTHER PUBLICATIONS

Kaur et al., "A Secure Data Classification Model in Cloud Computing Using Machine Learning Approach", International Journal of Grid and Distributed Computing vol. 9, No. 8 (Year: 2016).*
NPL Search (Google Scholar) (Year: 2021).*
NPL Search (InnovationQ) (Year: 2021).*

* cited by examiner

SEGMENTING, REDACTING, AND TRANSPORTING SECURE DOCUMENTS IN A MIXED SECURITY ENVIRONMENT

TECHNICAL FIELD

The present invention relates generally to a method, system, and computer program product for segmenting secure documents. More particularly, the present invention relates to a method, system, and computer program product for segmenting, redacting, and transporting secure documents in a mixed security environment.

BACKGROUND

Organizations often have an obligation to maintain clear separations between higher security content stored in a higher security environment and lower security content stored in a lower security environment. The separation may include physical and or logical separation. Examples of higher security content includes classified defense information, International Traffic in Arms Regulations (ITAR) information, export controlled information, Health Insurance Portability and Accountability Act (HIPPA) information, and personally identifiable information (PII). Personally identifiable information (PII) is information that can be using on its own or with other information to identify, contact, or locate a single person, or to identify an individual in context. The storage of higher security content separate from lower security content can often lead to significant information and communications technology (ICT) costs for an organization. ICT costs can be manifest in multiple ways including data duplication, and computer and network duplication. Separate, and often more expensive, staff needs to be maintained for the higher security side environment. For example, defense classified data is prevented from being off-shored and requires a specific set of staff.

SUMMARY

The illustrative embodiments provide a method, system, and computer program product. An embodiment of a method for segmentation and classification of documents in a mixed security environment includes receiving a document including a plurality of subcomponents, and determining a security classification level of each of the plurality of subcomponents using a first classification model. In the embodiment, the security classification level of each subcomponent includes one of a first classification level and a second classification level. The embodiment further includes routing a first subcomponent having the first classification level to a first environment having a first security level, and routing a second subcomponent having the second classification level to a second environment having a second security level. The embodiment further includes determining a pointer for the second subcomponent. In the embodiment, the pointer references a portion of the first subcomponent.

Another embodiment further includes determining an overall security classification level of the document using a second classification model, and determining that the overall security classification level of the document exceeds a first threshold value, wherein the determining of the security classification level of each of the plurality of subcomponents is responsive to the overall security classification level of the document exceeding the first threshold value.

In another embodiment, the first security level is less than the second security level. In another embodiment, the first classification level is less than the second classification level.

Another embodiment further includes storing the first subcomponent in the first environment. Another embodiment further includes storing the second subcomponent in the second environment. Another embodiment further includes storing the pointer in the second environment.

In another embodiment, the portion of the first subcomponent provides context for the second subcomponent.

Another embodiment further includes receiving a request for the second subcomponent within the second environment, retrieving the second component, retrieving the portion of the first component referenced by the pointer, and providing the second component and the portion of the first component.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
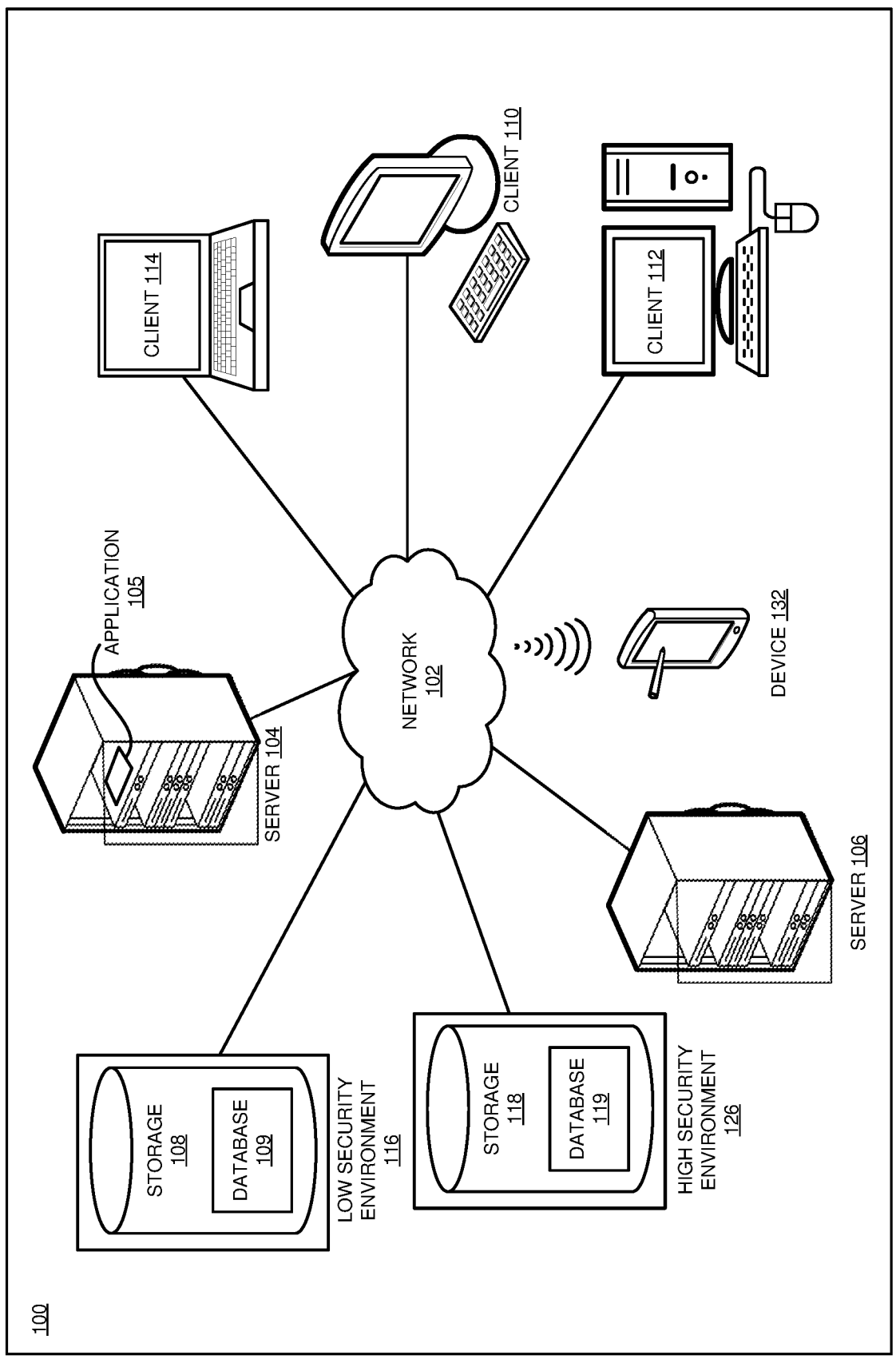
FIG. 1 depicts a block diagram of a network of data processing systems in which illustrative embodiments may be implemented.

The illustrative embodiments described herein are directed to segmenting, redacting, and transporting secure documents in a mixed security environment. One or more embodiments recognize that it is beneficial for decreasing the classification of content that does not warrant a high security classification in order to save costs associated with maintaining of high security classification content. One or more embodiments recognize that decreasing the security and/or PII classification of material is typically a manual review process. The result is data is often over-classified due to various organizational drivers such as efficiency of document owners and perceived higher value of 'high side' content. The result is an unobjective blurring of the security boundary and data duplication between the low security and high security environments which increases the security risks associated with the environments. In addition, extra cost is spent on ICT infrastructure on both networks.

One or more embodiments provide for optimal routing of high security content data and low security content data and segregation of mixed security content (e.g., content having a mixture of both higher security and lower security elements) to allow optimal routing, storage, and access. In one or more embodiments, documents which contain mixed security content are deconstructed. High security content is stored within a secure network environment and the lower security content is stored within a lower security environment. In one or more embodiments, pointers are stored in the high security environment in association with the high security content in which the pointers reference portions of the lower security content that is associated with or provides the context for the high security content. Accordingly, when a user accesses the high security content, the associated low security content is also accessed by the use of the pointers.

One or more embodiments leverage machine learning models to make routing and segmentation decisions across multiple security network domains. In an embodiment, a first machine learning model identifies the highest security classification of a document, and a second machine learning model identifies the differentiated content leading to the security classification. In the embodiment, the second machine learning model is used to segment the document data into a high security sections and low security sections. The high security section will contain pointer data structures to the low security section. The high security classified data structure remains only within the higher security environment and the low security data structure is allowed to "pass back" to the lower security environment. When accessing data on a secure document, the low security parts of the document are dynamically pulled and assembled on the high security side.

In various embodiments, a set or corpus of documents are developed in which content of the documents on the same topic occur at both a lower security level and a higher security level. In particular embodiments, the alignment of the lower security-to-higher security side document may be rules based or based on a machine learning model. Using this corpus, classification models are developed including a first classification model to determine an overall document security classification which does not require aligned training data, and a second classification model that uses aligned information to identify subcomponents (e.g., paragraphs, sentences, diagrams or entities) in the document which are determined to be at a higher classification or security level.

In an embodiment, upon creation of a document, the overall security classification of the document is assessed using the first classification model. If a document is created which is determined to have a low security classification, the document is stored in the low security environment, e.g., using a low security network. If the document is determined to have a high security classification, the high security elements or subcomponents of the document are routed to the high security environment and the low security elements or subcomponents of the document are routed to the low security environment. Further, pointer data structures are stored in the high security environment which reference low security elements or subcomponent that are associated with one or more of the high security components. Accordingly, in one or more embodiments, the availability of documents is increased across the network for the low security environment as well as a decrease in costs of the high security environment.

In an embodiment, an application on a server receives a document and determines an overall security classification of the document using a first classification model. If the overall security classification of the document is determined to be less than or equal to a predetermined threshold value, the application routes the document to a first environment having a first security level and stores the document in the first environment.

In the embodiment, if the overall security classification of the document is determined to be greater than the predetermined threshold value, the application determines a security classification of one or more document subcomponents using a second classification model. In particular embodiments, the application determines whether each subcomponent of the document is either a low security subcomponent or a high security subcomponent. In the embodiment, the application routes the low security subcomponents to the first environment and stores the low security subcomponents in the first environment. In the embodiment, the application routes the high security subcomponents to a second environment having a second security level. In one or more embodiments, the second security level is greater than the first security level.

In the embodiment, the application stores the high security subcomponents in the second environment. In the embodiment, the application determines one or more pointers from a high security subcomponent to one or more associated low security subcomponents, routes the pointers to the second environment, and stores the pointers in the second environment.

An embodiment can be implemented as a software application. The application implementing an embodiment can be configured as a modification of an existing collaborative messaging system or platform, as a separate application that operates in conjunction with an existing collaborative messaging system or platform, a standalone application, or some combination thereof.

The illustrative embodiments are described with respect to certain types of document segmentation and classification tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
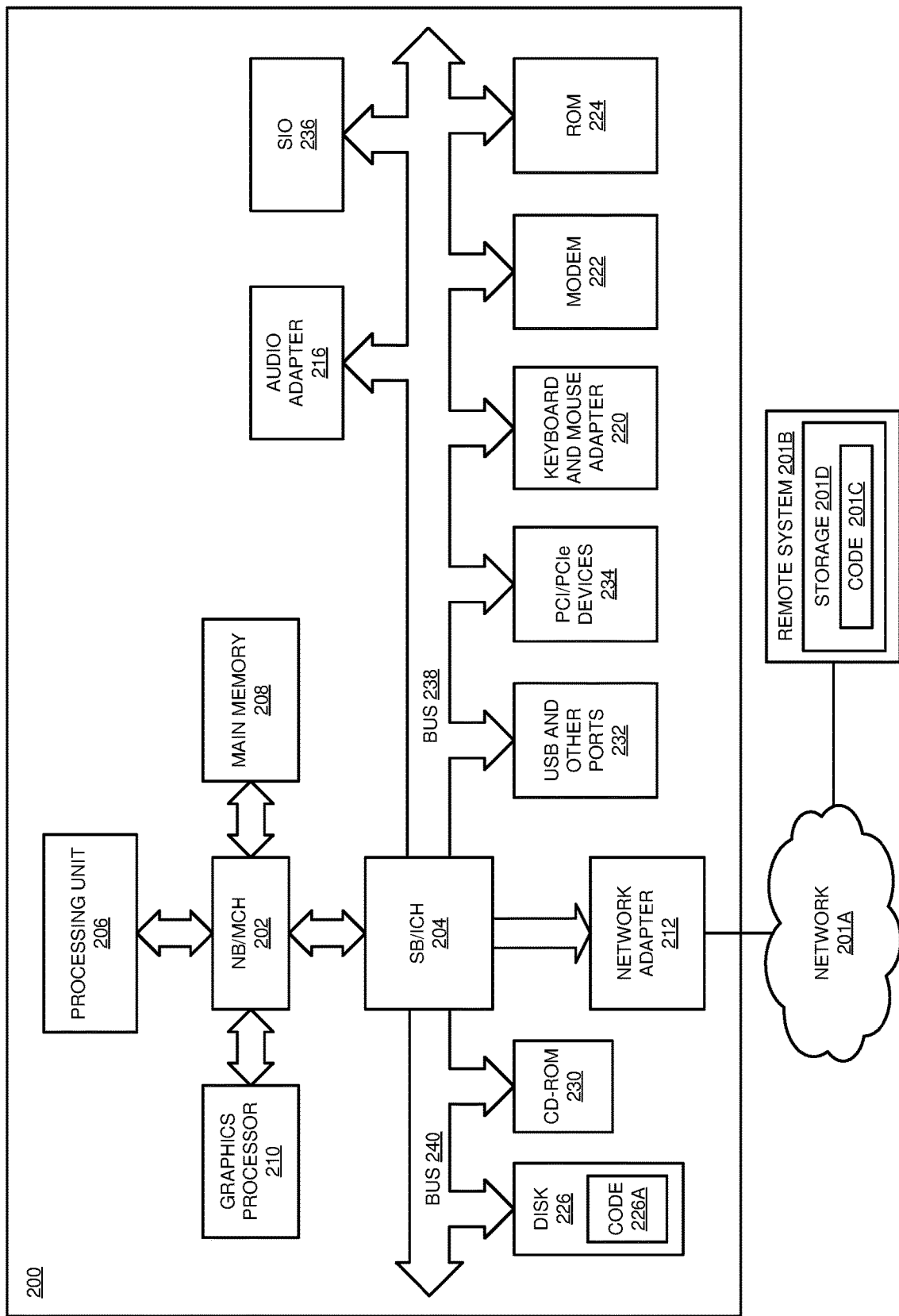
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108 located within a low security environment 116 and storage unit 118 located within a high security environment 126. Database 109 of storage device 108 is configured to store low security subcomponents of one or more documents. Database 119 of storage device 118 is configured to store high security subcomponents and pointer data structures of one or more documents. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes a client application 134 configured to perform functions of client application 134 described herein. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, storage unit 118 and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for segmenting, redacting, and transporting secure documents in a mixed security environment.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
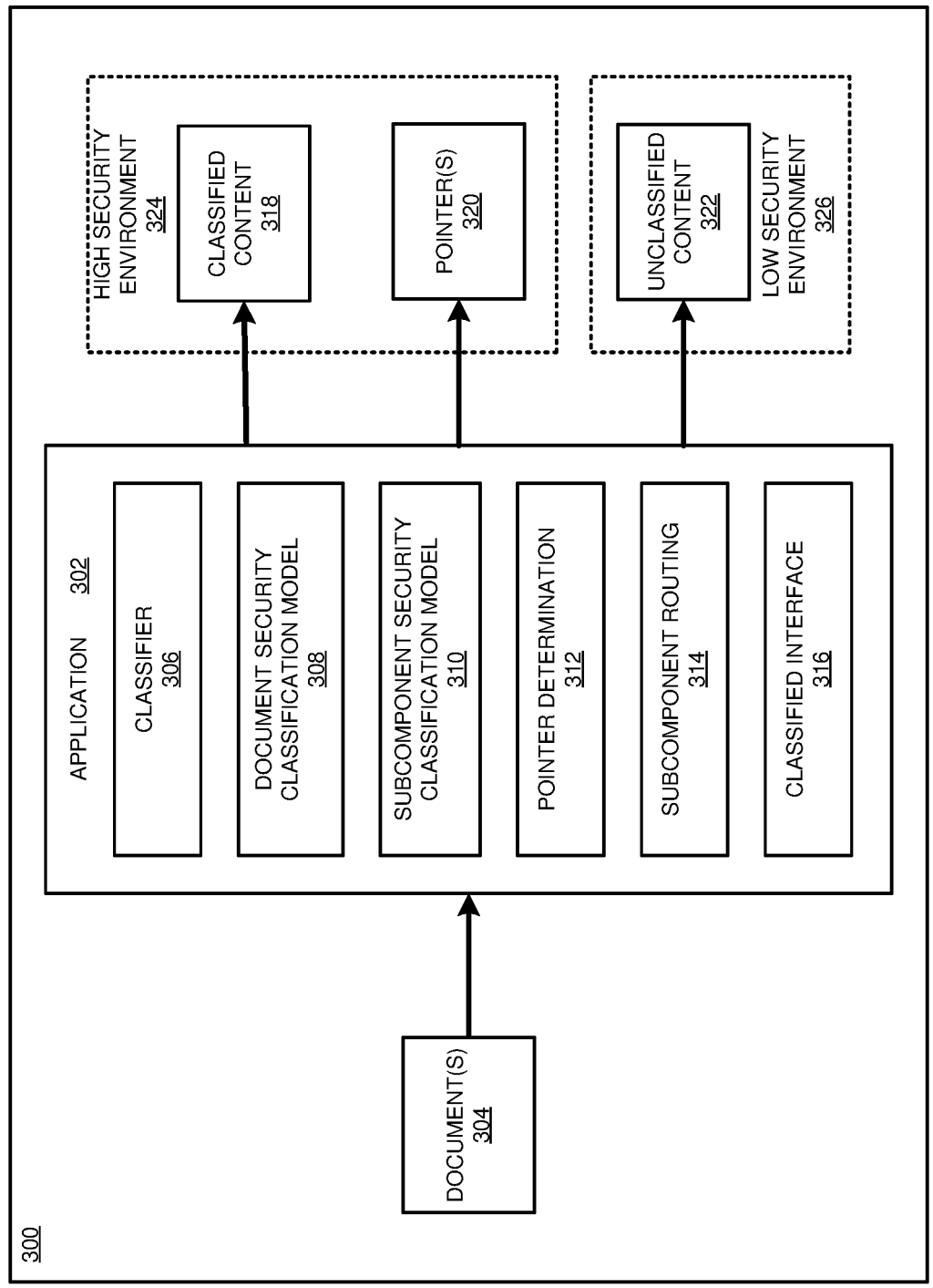
FIG. 3 depicts a block diagram of an example configuration for segmenting, redacting, and transporting secure documents in a mixed security environment in accordance with an illustrative embodiment.

With reference to FIG. 3, this figure depicts a block diagram of an example configuration 300 for segmenting, redacting, and transporting secure documents in a mixed security environment in accordance with an illustrative embodiment. The example embodiment includes an application 302. In a particular embodiment, application 302 is an example of application 105 of FIG. 1.

Applicant 302 receives one or more documents 304 which may contain a mixture of low security and high security subcomponents. Application 302 includes a classifier component 306, a document security classification model 308, a subcomponent security classification model 310, a pointer determination component 312, a subcomponent routing component 314, and a classified interface component 316.

Classifier component 306 is configured to classify a document as either low security or high security using document security classification model 308, and classify subcomponents of the document as either low security or high security using subcomponent security classification model 310. Pointer determination component 312 is configured to determine pointer structures for pointing from a high security subcomponent to an associated low security component. Subcomponent routing component 314 is configured to route high security subcomponents of document 304 as classified content 318 and one or more associated pointers 320 to high security environment 324 and route low security subcomponents as unclassified content of document 304 as unclassified content 322 to low security environment 326.

Classified interface 316 is configured to allow a user having permission to access classified content to retrieve classified content 318 and portions of unclassified content 322 associated with classified content 318 referenced by pointers 320.

Figure 4:
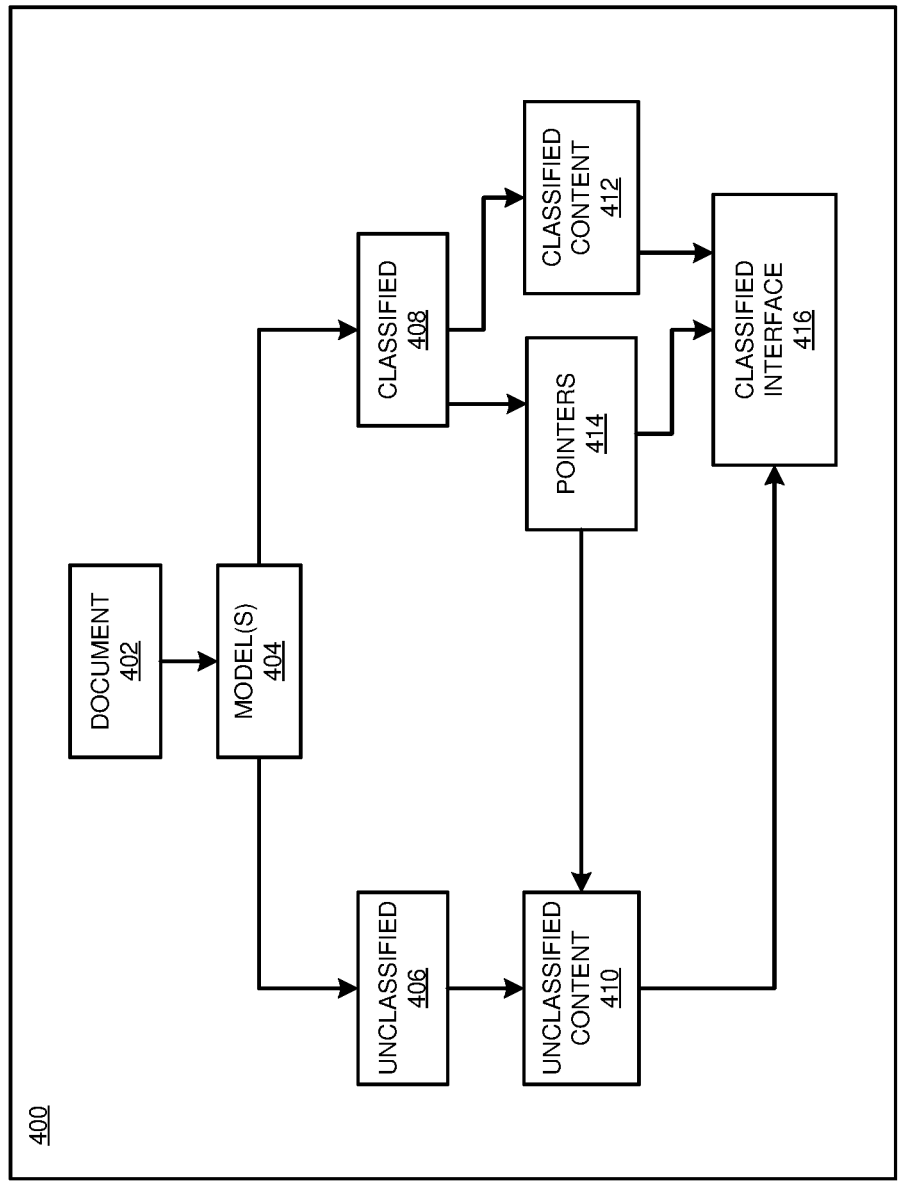
FIG. 4 depicts a block diagram of an example processing flow for segmenting, redacting, and transporting secure documents in a mixed security environment in accordance with an illustrative embodiment.

With reference to FIG. 4, this figure depicts a block diagram of an example processing flow 400 for segmenting, redacting, and transporting secure documents in a mixed security environment in accordance with an illustrative embodiment. In one or more embodiments, process flow 400 is implemented by application 105 of FIG. 1.

In an embodiment, a document 402 containing classified and unclassified subcomponents is provided to one or more classification models 404, and classification models 404 segment document 402 into unclassified subcomponents 406 and classified subcomponents 408. In the embodiment, unclassified subcomponents 406 are stored as unclassified content 410 within a lower security environment. In the embodiment, classified components are stored as classified content 412 within a higher security environment. In the embodiment, pointers 414 to portions of unclassified content 410 associated with classified subcomponents 408 are generated and stored within the higher security environment.

In response to a request from a user, classified interface 416 retrieves requested portions of classified content 412 and portions of unclassified content 410 referenced by pointers 414, and provides the portions of classified content 412 and portions of unclassified content 410 to the user.

Figure 5:
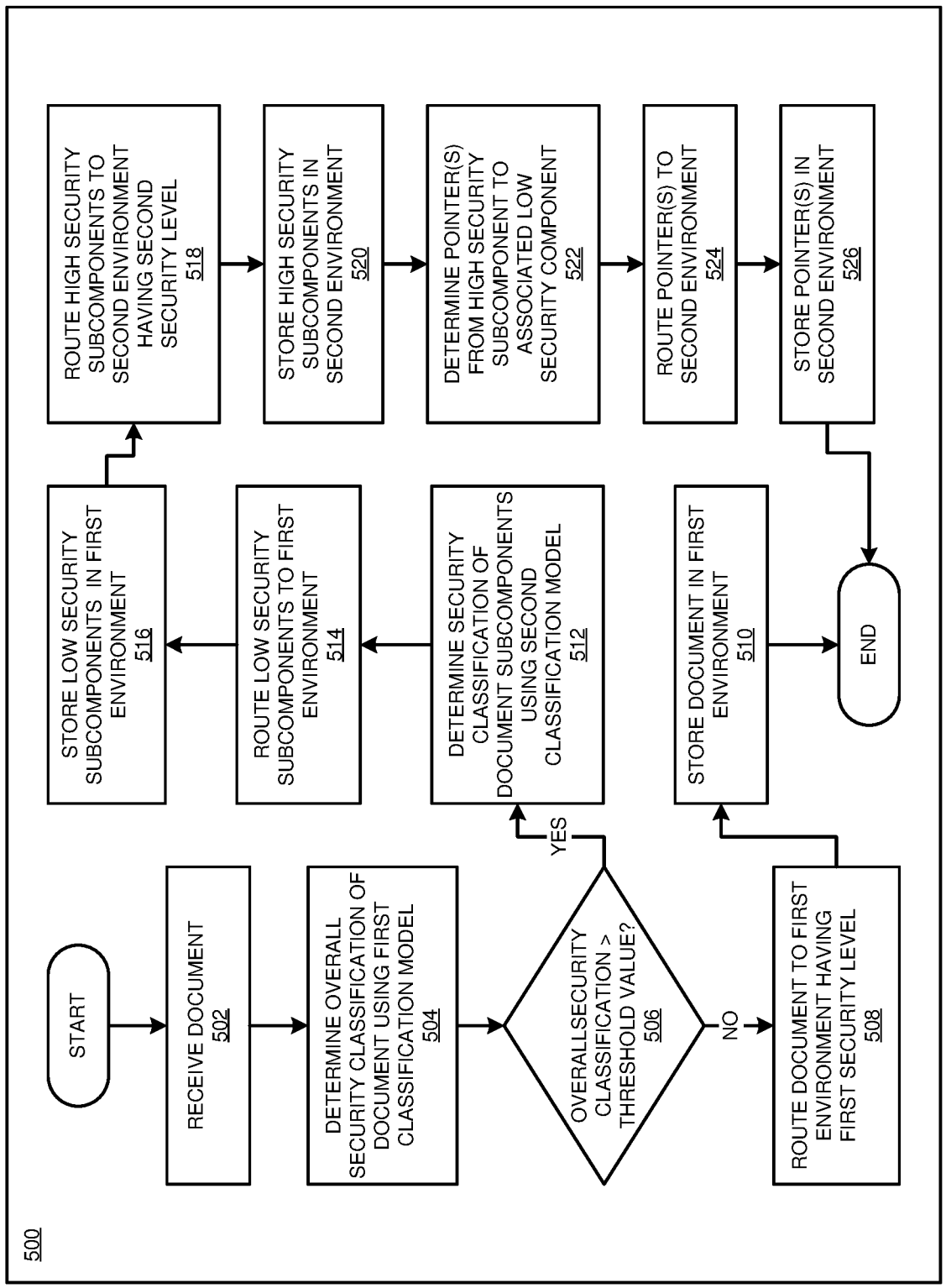
FIG. 5 depicts a flowchart of an example process for segmenting, redacting, and transporting secure documents in a mixed security environment in accordance with an illustrative embodiment.

With reference to FIG. 5, this figure depicts a flowchart of an example process 500 for segmenting, redacting, and transporting secure documents in a mixed security environment in accordance with an illustrative embodiment. In block 502, application 105 receives a document including a plurality of subcomponents in which each of the subcomponents potentially includes unclassified and classified content. In block 504, application 105 determines an overall security classification level of the document using a first classification model. In block 506, application 105 determines whether the overall security classification level of the document is greater than a predetermined threshold value.

If the overall security classification level of the document is determined to be less than or equal to a predetermined threshold value, in block 508, application 105 routes the document to a first environment having a first security level. In block 510, application 105 stores the document in the first environment and process 500 ends.

If the overall security classification level of the document is determined to be greater than the predetermined threshold value, in block 512, application 105 determines a security classification level of one or more document subcomponents using a second classification model. In one or more embodiments, application 105 determines whether each subcomponent of the document is either a low security subcomponent or a high security subcomponent. In particular embodiments, application 105 determines that a security classification level of the particular subcomponent is greater than a second predetermined threshold value.

In block 514, application 105 routes the low security subcomponents to the first environment. In block 516, application 105 stores the low security subcomponents in the first environment. In block 518, application 105 routes the high security subcomponents to a second environment having a second security level. In one or more embodiments, the second security level is greater than the first security level.

In block 520, application 105 stores the high security subcomponents in the second environment. In block 522, application 105 determines one or more pointers from a high security subcomponent to one or more associated low security subcomponents. In block 524, application 105 routes the pointers to the second environment. In block 526, application 105 stores the pointers in the second environment in association with the high security subcomponents. Process 500 then ends.

Thus, a computer implemented method, system or apparatus, and computer program product are provided in the illustrative embodiments for segmenting, redacting, and transporting secure documents in a mixed security environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for segmentation and classification of documents in a mixed security environment, the method comprising:

receiving a document including a plurality of subcomponents;

determining an overall security classification level of the document using a first machine learning classification model;
determining that the overall security classification level of the document exceeds a first threshold value;
determining, in response to the determining that the overall security classification level of the document exceeds the first threshold value, a security classification level of each of the plurality of subcomponents using a second machine learning classification model, the security classification level of each subcomponent including one of a first classification level and a second classification level;
routing a first subcomponent having the first classification level to a first environment having a first security level;
routing a second subcomponent having the second classification level to a second environment having a second security level; and
determining a pointer for the second subcomponent, the pointer referencing a portion of the first subcomponent.

2. The method of claim 1, wherein the first security level is less than the second security level.

3. The method of claim 1, wherein the first classification level is less than the second classification level.

4. The method of claim 1, further comprising:
storing the first subcomponent in the first environment.

5. The method of claim 1, further comprising:
storing the second subcomponent in the second environment.

6. The method of claim 1, further comprising:
storing the pointer in the second environment.

7. The method of claim 1, wherein the portion of the first subcomponent provides context for the second subcomponent.

8. The method of claim 1, further comprising:
receiving a request for the second subcomponent within the second environment;
retrieving the second subcomponent;
retrieving the portion of the first subcomponent referenced by the pointer; and
providing the second subcomponent and the portion of the first subcomponent.

9. A computer usable program product comprising one or more computer-readable storage devices, and program instructions stored on at least one of the one or more storage devices, the stored program instructions comprising:
program instructions to receive a document including a plurality of subcomponents;
program instructions to determine an overall security classification level of the document using a first machine learning classification model;
program instructions to determine that the overall security classification level of the document exceeds a first threshold value,
program instructions to determine, in response to the determining that the overall security classification level of the document exceeds the first threshold value, a security classification level of each of the plurality of subcomponents using a second machine learning classification model, the security classification level of each subcomponent including one of a first classification level and a second classification level;
program instructions to route a first subcomponent having the first classification level to a first environment having a first security level;
program instructions to route a second subcomponent having the second classification level to a second environment having a second security level; and
program instructions to determine a pointer for the second subcomponent, the pointer referencing a portion of the first subcomponent.

10. The computer usable program product of claim 9, wherein the first security level is less than the second security level.

11. The computer usable program product of claim 9, wherein the first classification level is less than the second classification level.

12. The computer usable program product of claim 9, further comprising:
program instructions to store the first subcomponent in the first environment.

13. The computer usable program product of claim 9, further comprising:
program instructions to store the second subcomponent in the second environment.

14. The computer usable program product of claim 9, further comprising:
program instructions to store the pointer in the second environment.

15. The computer usable program product of claim 9, wherein the portion of the first subcomponent provides context for the second subcomponent.

16. The computer usable program product of claim 9, wherein the program instructions are stored in a computer readable storage device in a data processing system, and wherein the program instructions are transferred over a network from a remote data processing system.

17. The computer usable program product of claim 9, wherein the program instructions are stored in a computer readable storage device in a server data processing system, and wherein the program instructions are downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive a document including a plurality of subcomponents;
program instructions to determine an overall security classification level of the document using a first machine learning classification model;
program instructions to determine that the overall security classification level of the document exceeds a first threshold value,
program instructions to determine, in response to the determining that the overall security classification level of the document exceeds the first threshold value, a security classification level of each of the plurality of subcomponents using a second machine learning classification model, the security classification level of each subcomponent including one of a first classification level and a second classification level;
program instructions to route a first subcomponent having the first classification level to a first environment having a first security level;

program instructions to route a second subcomponent having the second classification level to a second environment having a second security level; and
program instructions to determine a pointer for the second subcomponent, the pointer referencing a portion of the first subcomponent.

\* \* \* \* \*